(12) United States Patent
Wagner

(10) Patent No.: US 7,532,218 B1
(45) Date of Patent: May 12, 2009

(54) METHOD AND APPARATUS FOR MEMORY TRAINING CONCURRENT WITH DATA TRANSFER OPERATIONS

(75) Inventor: Barry Wagner, San Jose, CA (US)

(73) Assignee: nVidia Corporation, Santa Clara, CA (US)

( * ) Notice: Subject to any disclaimer, the term of this patent is extended or adjusted under 35 U.S.C. 154(b) by 206 days.

(21) Appl. No.: 11/048,986

(22) Filed: Feb. 1, 2005

(51) Int. Cl.
G06F 13/372 (2006.01)
G06F 13/00 (2006.01)
G06F 13/28 (2006.01)
G09G 5/39 (2006.01)

(52) U.S. Cl. ............... 345/534; 345/531; 345/532; 345/536; 711/167

(58) Field of Classification Search ........... 345/532, 345/503, 543; 711/149, 105; 395/845
See application file for complete search history.

(56) References Cited

U.S. PATENT DOCUMENTS

| 5,761,533 | A | * | 6/1998 | Aldereguia et al. | 710/25 |
| 6,346,946 | B1 | * | 2/2002 | Jeddeloh | 345/503 |
| 7,019,752 | B1 | * | 3/2006 | Paquette et al. | 345/543 |
| 7,151,543 | B1 | * | 12/2006 | Moreton et al. | 345/531 |
| 7,286,134 | B1 | * | 10/2007 | Van Dyke et al. | 345/544 |
| 2002/0013881 | A1 | * | 1/2002 | Delp et al. | 711/105 |
| 2003/0001861 | A1 | * | 1/2003 | Watson et al. | 345/609 |
| 2004/0019748 | A1 | * | 1/2004 | Lee | 711/149 |

* cited by examiner

Primary Examiner—Kee M Tung
Assistant Examiner—Jacinta Crawford
(74) Attorney, Agent, or Firm—Berkeley Law & Technology Group, LLP

(57) ABSTRACT

Embodiments of methods and apparatus for memory training concurrent with data transfers are disclosed. For an example embodiment, data may be transferred from a first memory device to a first partition of a memory controller, and a training operation may be performed for a second partition of the memory controller coupled to a second memory device while the first partition of the memory controller is transferring data from the first memory device.

21 Claims, 6 Drawing Sheets

METHOD AND APPARATUS FOR MEMORY TRAINING CONCURRENT WITH DATA TRANSFER OPERATIONS

FIELD

This application pertains to the field of memory controllers, and more particularly, to the field of memory interconnects.

BACKGROUND

A wide range of electronic devices include graphics processing units (GPU). Some examples of devices that may include a GPU include computer systems, gaming consoles, digital video disc (DVD) players, etc. A GPU may include graphics memory controllers that interface with local graphics memory devices. In a continuing effort to increase graphics subsystem performance, interconnect speeds between the graphics memory controllers and the local graphics memory devices are increasing. Training techniques may be used on these interconnects to adjust various parameters associated with data transfers between the graphics memory controller and the local graphics memory devices in order to allow increased clock frequencies.

Training operations may include manipulating a variety of parameters which may include driver impedance, termination impedance, reference voltage levels, data strobe timing, etc. Training operations may take significant periods of time and may prevent a GPU from delivering display data to a display device for those significant periods of time. It would be desirable to allow a GPU to deliver display data to a display device while training operations are being performed.

Similar training operations may also occur with other interfaces, including system memory interfaces. It would be desirable to allow data transfers while training operations are being performed.

BRIEF DESCRIPTION OF THE DRAWINGS

The claimed subject matter will be understood more fully from the detailed description given below and from the accompanying drawings of embodiments which, however, should not be taken to limit the claimed subject matter to the specific embodiments described, but are for explanation and understanding only.

DETAILED DESCRIPTION

Figure 1:
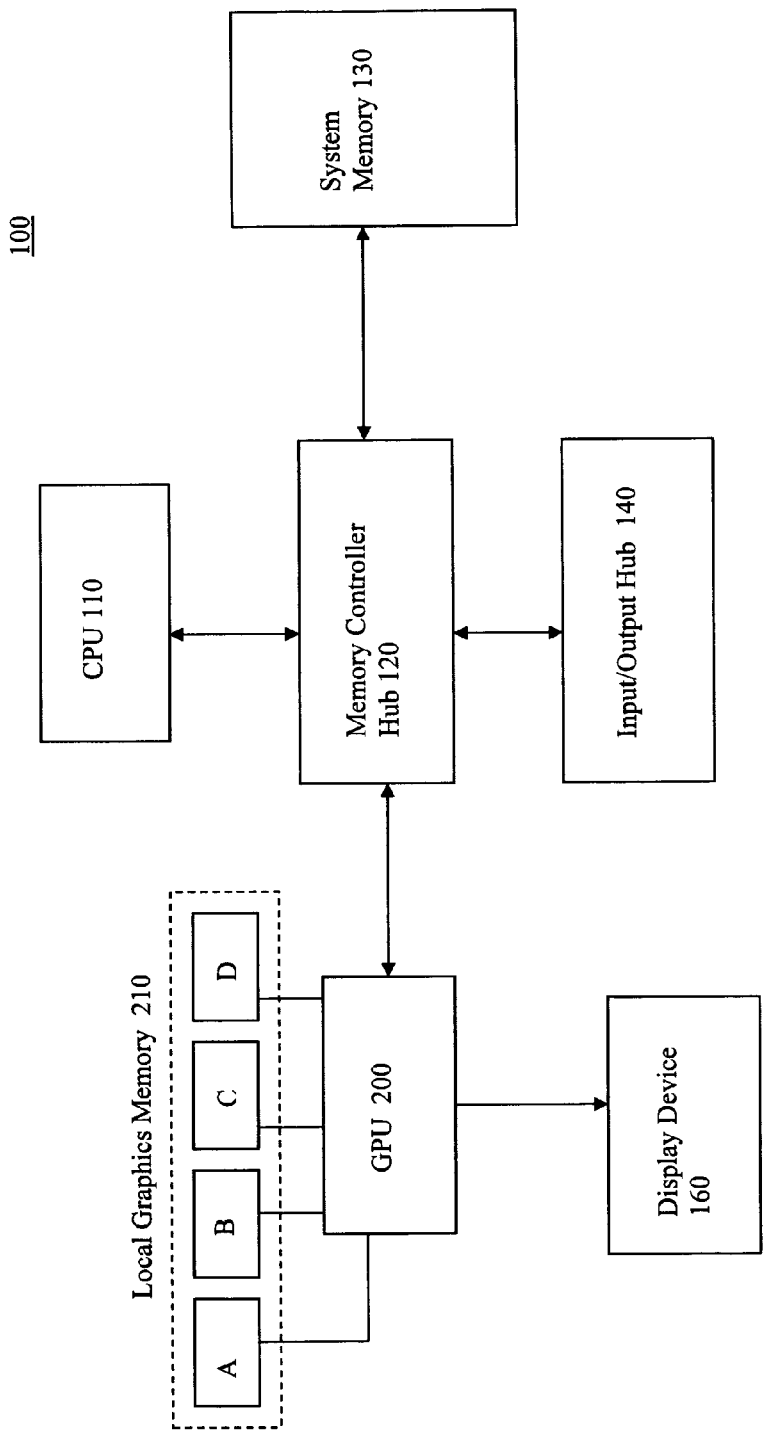
FIG. 1 is a block diagram of one embodiment of an example system including a GPU coupled to a local graphics memory.

FIG. 1 is a block diagram of one embodiment of an example system 100 including a GPU 200 coupled to a local graphics memory 210. System 100 also includes a central processing unit (CPU) 110, a system memory 130, and an input/output hub 140. A memory controller 120 allows communication among CPU 110, system memory 130, input/output hub 140, and GPU 200. GPU 200 is coupled to a display device 160.

For this example system, local graphics memory 210 includes four separate interfaces. Local graphics memory may include a number of different graphics memory devices. For this example embodiment, there are four graphics memory devices, labeled A through D. Of course, other embodiments are possible with other numbers and configurations of interfaces and memory devices. The interconnects between local graphics memory 210 and GPU 200 may be serial interfaces, or may be parallel interfaces.

Figure 2:
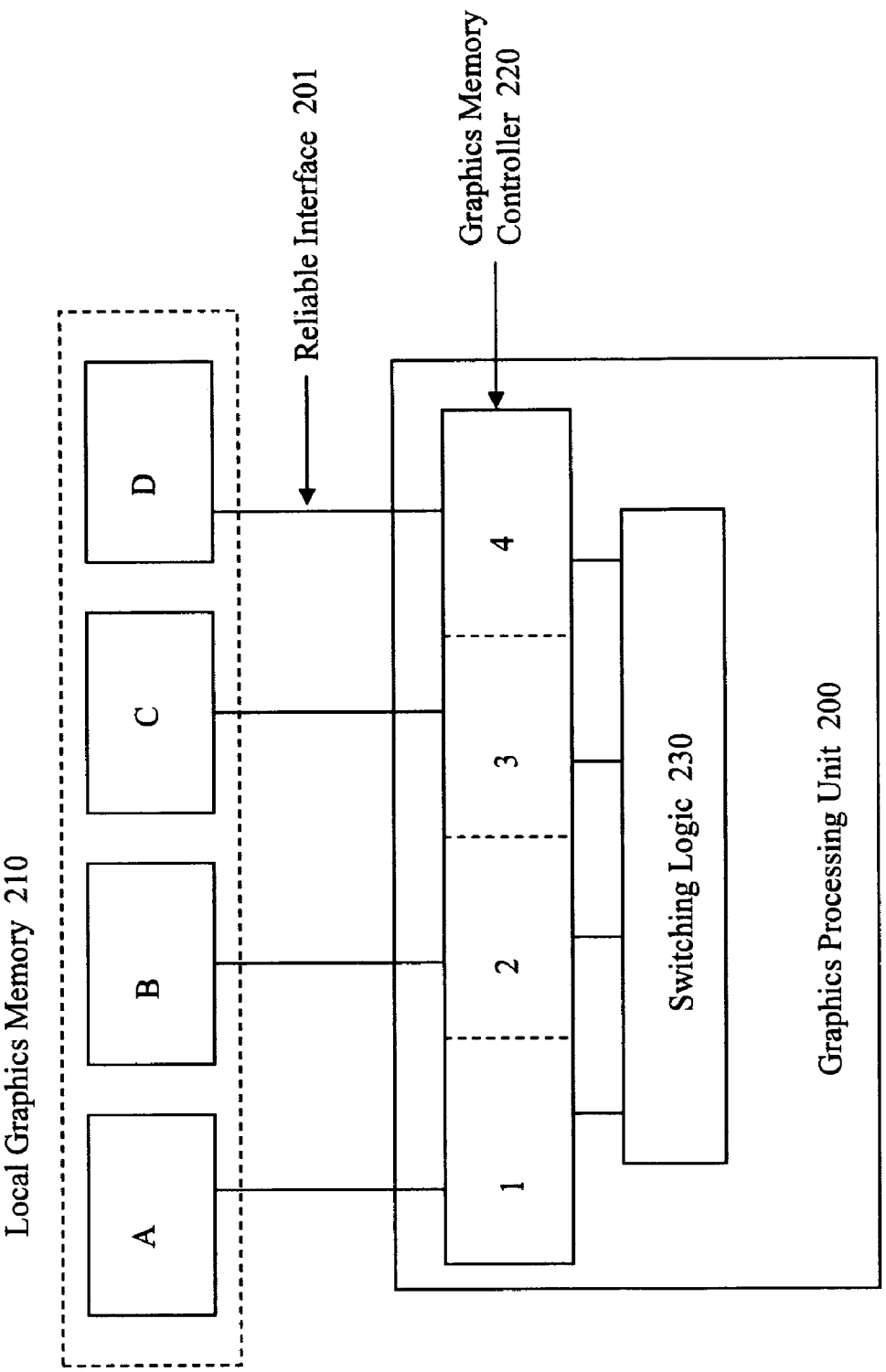
FIG. 2 is a block diagram of one embodiment of a GPU coupled to a local graphics memory.

FIG. 2 is a block diagram showing one embodiment of GPU 200 coupled to local graphics memory 210. As mentioned above, for this example embodiment, local graphics memory 210 includes a number of graphics memory devices, labeled A through D. Graphics Processing Unit 200 includes a graphics memory controller 220 and a switching logic 230. The graphics memory controller 230 for this example is divided into four partitions, labeled 1 through 4. Each of the partitions corresponds to one of the graphics memory devices, and provides communication with the corresponding graphics memory devices. Switching logic 230 determines which of the graphics memory controller partitions is active and may determine various aspects of graphics data transfers between the graphics memory controller partitions and their associated graphics memory devices.

As used herein, the term "memory controller partition" is meant to include not only distinct portions of a single memory controller associated with corresponding memory device interfaces, but also includes multiple discrete memory controllers.

For this example embodiment, whenever it is necessary to perform training operations for the graphics memory controller partitions, switching logic 230 causes the graphics memory controller to perform graphics data transfers to or from only one of the graphics memory devices. For this example, the partition used is partition 4 which communicates with graphics memory device D over what may be referred to as reliable interface 201. The term "reliable interface" is meant to include a wide range of interconnect technologies that may provide reliable operation without first requiring training operations. For example, reliable interface 201 may be operated at a reduced clock frequency to help ensure reliable operation.

While GPU 200 is performing operations while operating out of graphics memory device D over reliable interface 201, one or more of the other graphics memory controller partitions may undergo training operations in anticipation of operating the associated interconnects at a high speed. Once one or more of the other graphics memory controller partitions have completed the training operations, switching logic 230 may allow graphics data transfers to occur using the recently trained interconnects.

For this example embodiment, once the training operations for graphics memory controller partitions 1-3 are completed and GPU 200 is performing operations out of graphics memory devices A, B, and C, reliable interface 201 may undergo training operations in order to allow operation at higher clock frequencies.

Figure 3:
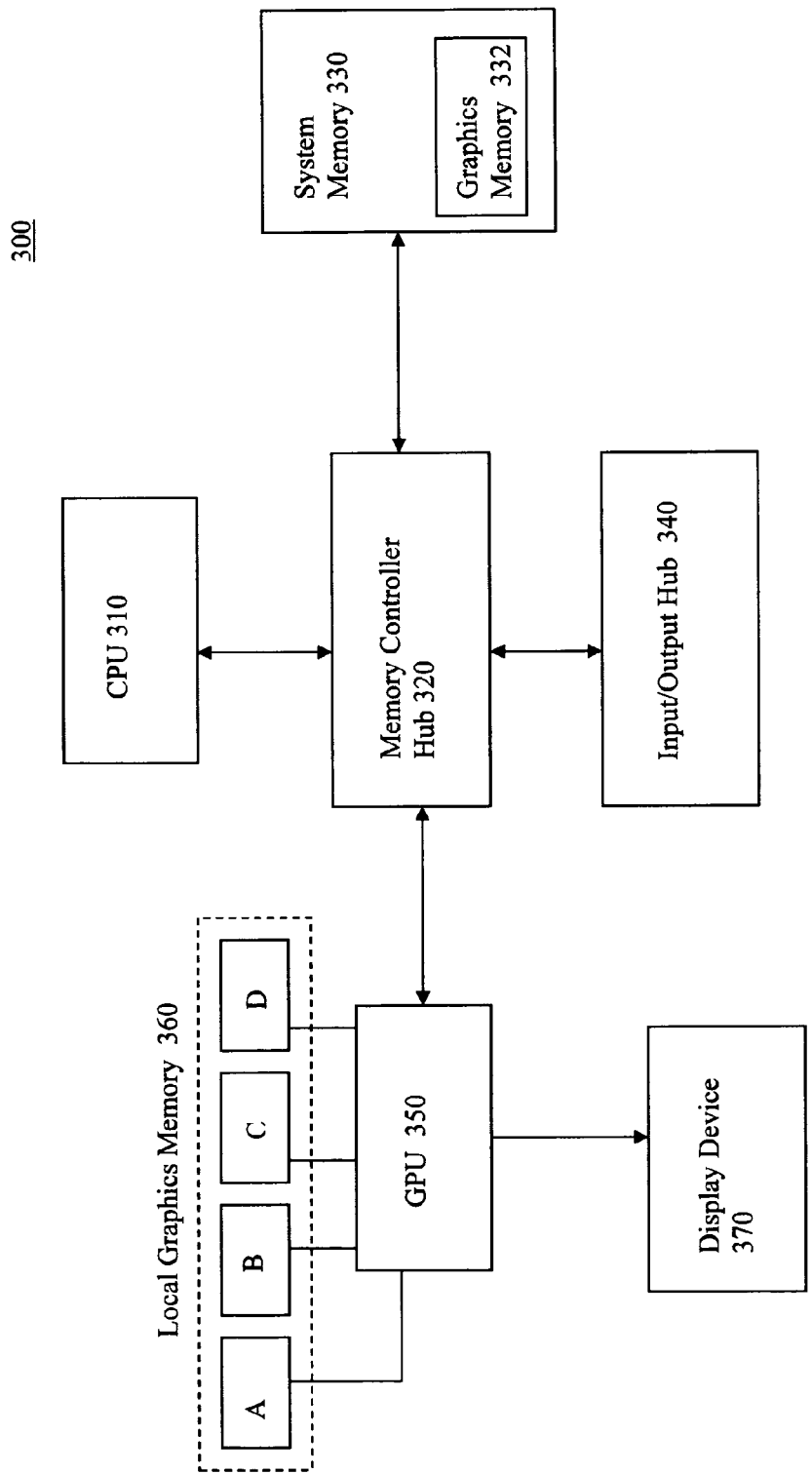
FIG. 3 is a block diagram of one embodiment of an example system including a graphics memory block located within a system memory.

FIG. 3 is a block diagram of one embodiment of an example system 300 including a graphics memory block 332 located within a system memory 330. System 300 includes a CPU 310 coupled to a memory controller hub 320, which is also coupled to system memory 330 and a GPU 350. Memory controller hub 320 is further coupled to an input/output hub 340. GPU 350 provides display data to a display device 370.

This example system is similar to system 100 discussed above, except that graphics memory block 332 within system memory 330 is used as the reliable memory that can be used to perform graphics operations while training operations are performed on the interconnects between local graphics memory devices A, B, C, and D and GPU 350. A memory controller (not shown) within the memory controller hub 320 may be considered to be a graphics memory controller partition for this example because for this example a portion of system memory 330 is used for graphics memory.

Although systems 100 and 300 are described with particular configurations, many other embodiments are possible using other system configurations. Further, many other graphics processing unit and graphics memory embodiments are possible other than the example embodiments described herein. Also, although the embodiments described herein utilize multiple partitions within a single graphics memory controller, other embodiments may use one or more discrete graphics memory controllers.

Graphics processing unit embodiments that use a reliable graphics memory interconnect while other graphics memory interconnects are being trained may be included in a wide range of electronic devices, including, but not limited to, computer systems, game consoles, DVD players, etc.

Further, although the above discussion in connection with FIGS. 1 through 3 mention multiple graphics memory controller partitions and training graphics memory interconnects, the range of possible embodiments is not limited to graphics memory implementations. Other embodiments are possible where other memory controllers, including, but not limited to, system memory controllers, are divided into at least two partitions and one partition is used to perform data transfers over a reliable interconnect while another interconnect associated with a second partition is involved in training operations.

Figure 4:
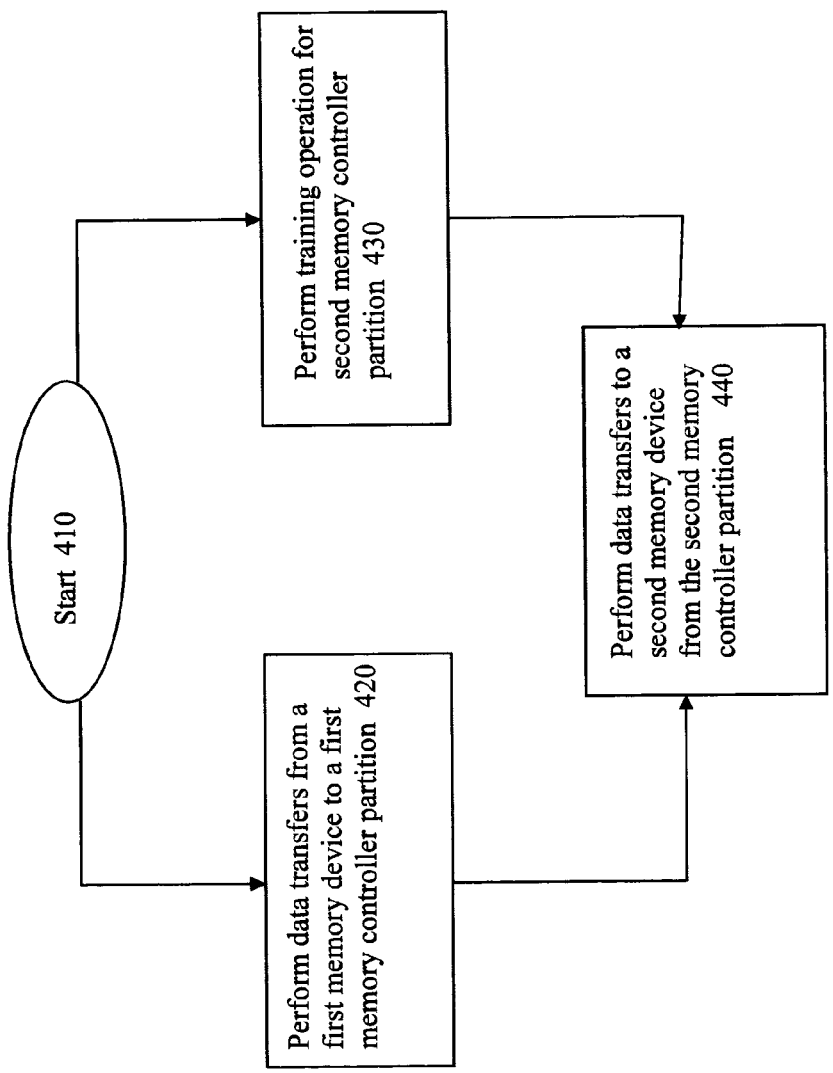
FIG. 4 is a flow diagram of one embodiment of an example method for training a memory interface while allowing data transfers.

FIG. 4 is a flow diagram of one embodiment of an example method for training a memory interface while allowing data transfers. The processing begins at block 410, and continues at blocks 420 and 430. The operations at blocks 420 and 430 may occur simultaneously. At block 420, data transfers are performed from a first memory device to a first memory controller partition. At block 430, a training operation for a second memory controller partition is performed. Processing then moves to block 440, where data transfers are performed to a second memory device from the second memory controller partition.

Figure 5:
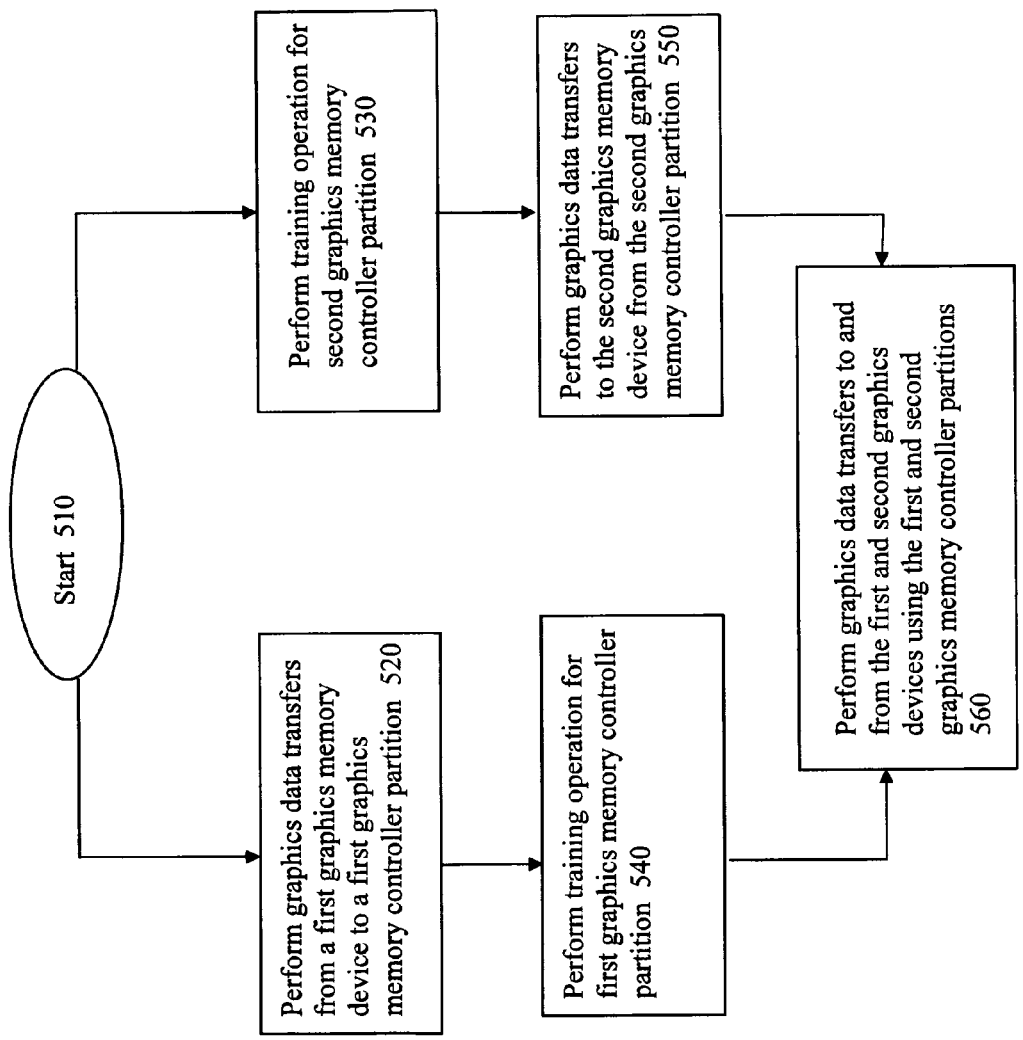
FIG. 5 is a flow diagram of one embodiment of an example method for training a graphics memory interface while allowing graphics data transfers.

FIG. 5 is a flow diagram of one embodiment of an example method for training a graphics memory interface while allowing graphics data transfers. Processing begins at block 510 and moves to blocks 520 and 530. At block 520, graphics data transfers are performed from a first graphics memory device to a first graphics memory controller partition. At block 530, a training operation for a second graphics memory controller partition is performed. Processing then proceeds to blocks 540 and 550. At block 540, a training operation for the first graphics memory controller is performed. At block 550, graphics data transfers are performed to the second graphics memory device from the second graphics memory controller partition. Processing then moves to block 560, where graphics data transfers are performed to and from the first and second graphics memory devices using the first and second graphics memory controller partitions.

Figure 6:
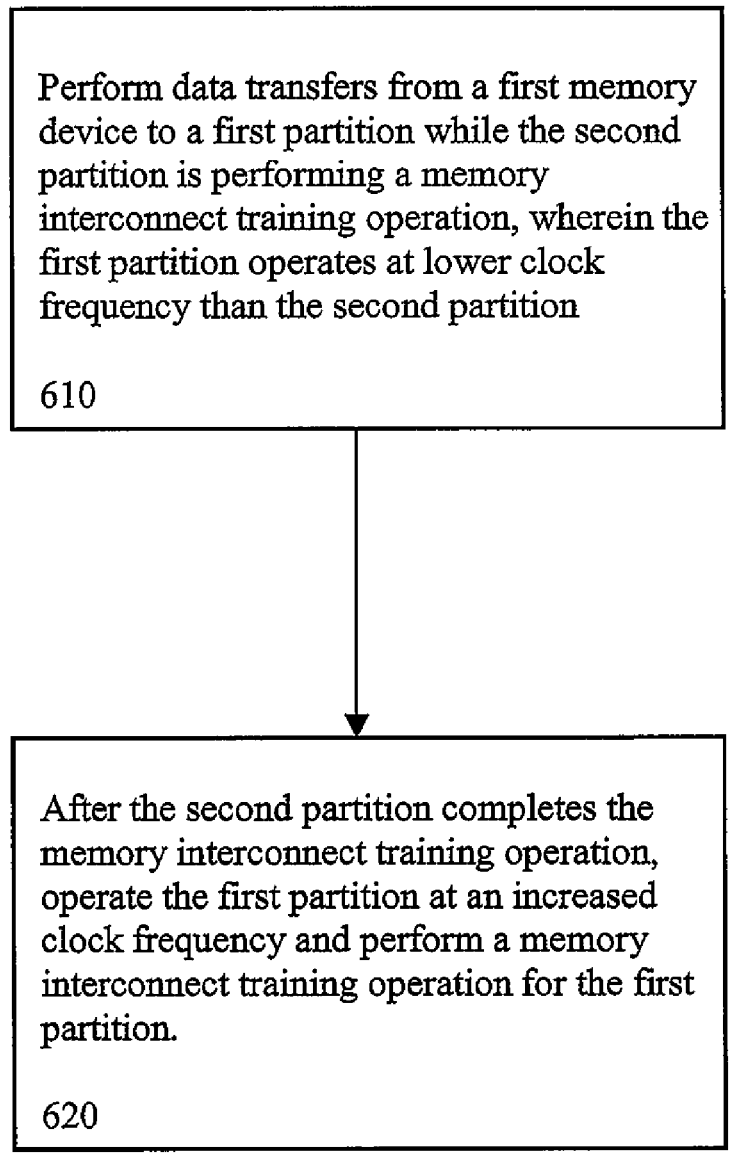
FIG. 6 is a flow diagram of one embodiment of an example method for training a memory interface while allowing data transfers.

FIG. 6 is a flow diagram of one embodiment of an example method for training a memory interface while allowing data transfers. At 610, data transfers are performed from a first memory device to a first partition while the second partition is performing a memory interconnect training operation, wherein the first partition operates at lower clock frequency than the second partition. At 620, after the second partition completes the memory interconnect training operation, the first partition is operated at an increased clock frequency and a memory interconnect training operation is performed for the first partition.

Although the embodiments described herein may use any of a wide range of interconnect training techniques, one such technique may include powering up a memory controller device to a default driver and termination impedance. Clock frequencies may be set to a desired frequency. Then, a data strobe may trained to be positioned at least approximately in the middle of a valid data window. Next, a reference voltage may be trained to the middle of its window. The data strobe may then be trained again to be positioned in the middle of its window. Then, the driver impedance may be trained to fall somewhere in the middle of a range of good values. The data strobe may then again be trained to be positioned in the middle of its window. Next, the termination impedance may be trained to the middle of its window, and then the reference voltage may then again be trained. Lastly, the data strobe may then again be trained to occur approximately in the middle of the valid data window.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather than in a restrictive sense.

What is claimed is:

1. An apparatus, comprising:
 a memory controller comprising a first and a second partition, the second partition to perform a first memory interconnect training operation, and the first partition to perform a first data transfer at a reduced data rate from a first memory device concurrently with the first memory interconnect training operation, the first partition further to perform an additional memory interconnect training operation after completion of the first memory interconnect training operation.

2. The apparatus of claim 1, wherein the memory controller comprises a graphics memory controller.

3. The apparatus of claim 1, the first partition to operate at a lower clock frequency than the second partition for the first data transfer from the first memory device.

4. The apparatus of claim 3, the second partition to perform a second data transfer to a second memory device after completion of the first memory interconnect training operation.

5. The apparatus of claim 4, the first partition further to perform an additional data transfer operation at an increased clock frequency after completion of the additional memory interconnect training operation.

6. A system, comprising:
a first memory device;
a second memory device; and
a memory controller coupled to the first and second memory devices, the memory controller comprising a first and a second partition, the second partition to perform a first memory interconnect training operation, and the first partition to perform a first data transfer at a reduced data rate from the first memory device concurrently with the first memory interconnect training operation, the first partition further to perform an additional memory interconnect training operation after completion of the first memory interconnect training operation.

7. The system of claim 6, the first partition to operate at a lower clock frequency than the second partition for the first data transfer from the first memory device.

8. The system of claim 7, the second partition to perform a second data transfer to the second memory device after completion of the first memory interconnect training operation.

9. The system of claim 8, the first partition to perform an additional data transfer operation at an increased data rate after completion of the additional memory interconnect training operation.

10. The system of claim 6, wherein the first memory device comprises at least a portion of a system memory.

11. The system of claim 6, wherein the first memory device comprises a first graphics memory device, wherein the second memory device comprises a second graphics memory device, and wherein the memory controller comprises a graphics processing unit.

12. The system of claim 11, wherein the first graphics memory device comprises a local graphics memory device.

13. The system of claim 11, wherein the first graphics memory device comprises at least a portion of a system memory.

14. A method, comprising:
transferring data from a first memory device to a first partition of a memory controller at a reduced data rate;
performing a first memory interconnect training operation for a second partition of the memory controller coupled to a second memory device concurrently with the transfer of data from the first memory device to the first partition of the memory controller; and
performing an additional memory interconnect training operation for the first partition of the memory controller after completion of the first memory interconnect training operation at the second partition.

15. The method of claim 14, wherein said transferring data from the first memory device includes operating the first partition of the memory controller at a lower clock frequency than the second partition.

16. The method of claim 14, further comprising performing a second data transfer to the second memory device from the second partition of the memory controller after completion of the first memory interconnect training operation for the second partition.

17. The method of claim 16, further comprising operating the first partition at an increased clock frequency and transferring additional data from the first memory device to the first partition of the memory controller after completion of the additional memory interconnect training operation for the first partition.

18. The method of claim 14, wherein said transferring data from the first memory device comprises transferring data from at least a portion of a system memory to the first partition.

19. The method of claim 16, wherein said transferring data from the first memory device to the first partition comprises transferring graphics data from a first graphics memory device to a first partition of a graphics memory controller, and further wherein said performing the first memory interconnect training operation for the second partition comprises performing a first memory interconnect training operation for a second partition of the graphics memory controller concurrently with the transfer of data from a first graphics memory device to the first partition of the graphics memory controller.

20. The method of claim 19, further comprising operating the first partition of the graphics memory controller at an increased clock frequency and transferring additional data from the first graphics memory device to the first partition of the graphics memory controller after completion of the additional training operation for the first partition of the graphics memory controller.

21. The method of claim 19, wherein said transferring graphics data from the first graphics memory device includes transferring graphics data from a local graphics memory device.

* * * * *